United States Patent
Harada et al.

(10) Patent No.: US 10,041,394 B2
(45) Date of Patent: Aug. 7, 2018

(54) AIR/OIL-COOLED INTERNAL COMBUSTION ENGINE

(71) Applicant: HONDA MOTOR CO., LTD., Tokyo (JP)

(72) Inventors: Makoto Harada, Wako (JP); Yuki Nagata, Wako (JP); Teppei Hakamata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 104 days.

(21) Appl. No.: 15/202,904

(22) Filed: Jul. 6, 2016

(65) Prior Publication Data

US 2017/0009640 A1    Jan. 12, 2017

(30) Foreign Application Priority Data

Jul. 9, 2015    (JP) .................... 2015-137612

(51) Int. Cl.
*F01P 11/16*    (2006.01)
*F01P 3/02*    (2006.01)
(Continued)

(52) U.S. Cl.
CPC .............. *F01P 11/16* (2013.01); *B62J 31/00* (2013.01); *B62K 11/04* (2013.01); *F01L 1/022* (2013.01);
(Continued)

(58) Field of Classification Search
CPC ........ F01P 11/16; F01P 3/02; F01P 2003/006; F01P 2003/021; F01P 2003/024;
(Continued)

(56) References Cited

U.S. PATENT DOCUMENTS

2005/0139403 A1*  6/2005  Gokan ................... B62K 11/04
                                                    180/68.4
2010/0065011 A1*  3/2010  Sugiura .................... F01P 3/02
                                                    123/195 C
(Continued)

FOREIGN PATENT DOCUMENTS

JP     2009-013835 A     1/2009
JP     2009-236053 A    10/2009
(Continued)

*Primary Examiner* — Joseph Dallo
*Assistant Examiner* — Yi-Kai Wang
(74) *Attorney, Agent, or Firm* — Rankin, Hill & Clark LLP

(57) ABSTRACT

An air/oil-cooled internal combustion engine capable of increasing accuracy in detection of the temperature of the air/oil-cooled internal combustion engine by a temperature sensor and carrying out the warm-up operation after the start-up of the air/oil-cooled internal combustion engine favorably. The air/oil-cooled internal combustion engine includes cooling fins that are provided on the circumferences of a cylinder block and a cylinder head; and a cooling passage that is provided in a combustion chamber upper wall covering a combustion chamber of the cylinder head and is used for cooling the combustion chamber upper wall with lubrication oil. The air/oil-cooled internal combustion engine has a temperature sensor configured to detect the temperature of the air/oil-cooled internal combustion engine by detecting the temperature of oil. The temperature sensor faces a cooling oil outlet portion of the cooling passage.

13 Claims, 9 Drawing Sheets

(51) Int. Cl.
    *F02F 1/36*     (2006.01)
    *F02F 1/28*     (2006.01)
    *F01L 1/02*     (2006.01)
    *B62J 31/00*     (2006.01)
    *B62K 11/04*     (2006.01)
    *F02B 77/08*     (2006.01)
    *F01L 1/047*     (2006.01)
    *F01L 1/053*     (2006.01)
    *F01P 3/00*     (2006.01)

(52) U.S. Cl.
    CPC .............. F01P 3/02 (2013.01); F02B 77/089 (2013.01); F02F 1/28 (2013.01); F02F 1/36 (2013.01); *F01L 2001/0475* (2013.01); *F01L 2001/0476* (2013.01); *F01L 2001/0535* (2013.01); *F01L 2105/00* (2013.01); *F01L 2810/02* (2013.01); *F01P 2003/006* (2013.01); *F01P 2003/021* (2013.01); *F01P 2003/024* (2013.01)

(58) Field of Classification Search
    CPC . B62J 31/00; B62K 11/04; F01L 1/022; F01L 2001/0475; F01L 2001/0476; F01L 2001/0535; F01L 2105/00; F01L 2810/02; F02B 77/089; F02F 1/28; F02F 1/36
    USPC .................................................. 123/196 AB
    See application file for complete search history.

(56) References Cited

U.S. PATENT DOCUMENTS

| | | | |
|---|---|---|---|
| 2010/0223915 A1* | 9/2010 | Sugiura | F01L 1/053 60/287 |
| 2013/0186352 A1* | 7/2013 | Kumagai | F01P 1/00 123/41.11 |
| 2015/0024887 A1* | 1/2015 | Oh | F16H 7/08 474/110 |
| 2017/0248064 A1* | 8/2017 | Kudo | F01P 3/02 |

FOREIGN PATENT DOCUMENTS

| | | |
|---|---|---|
| JP | 2012-215172 | 11/2012 |
| JP | 2013-072353 | 4/2013 |

* cited by examiner

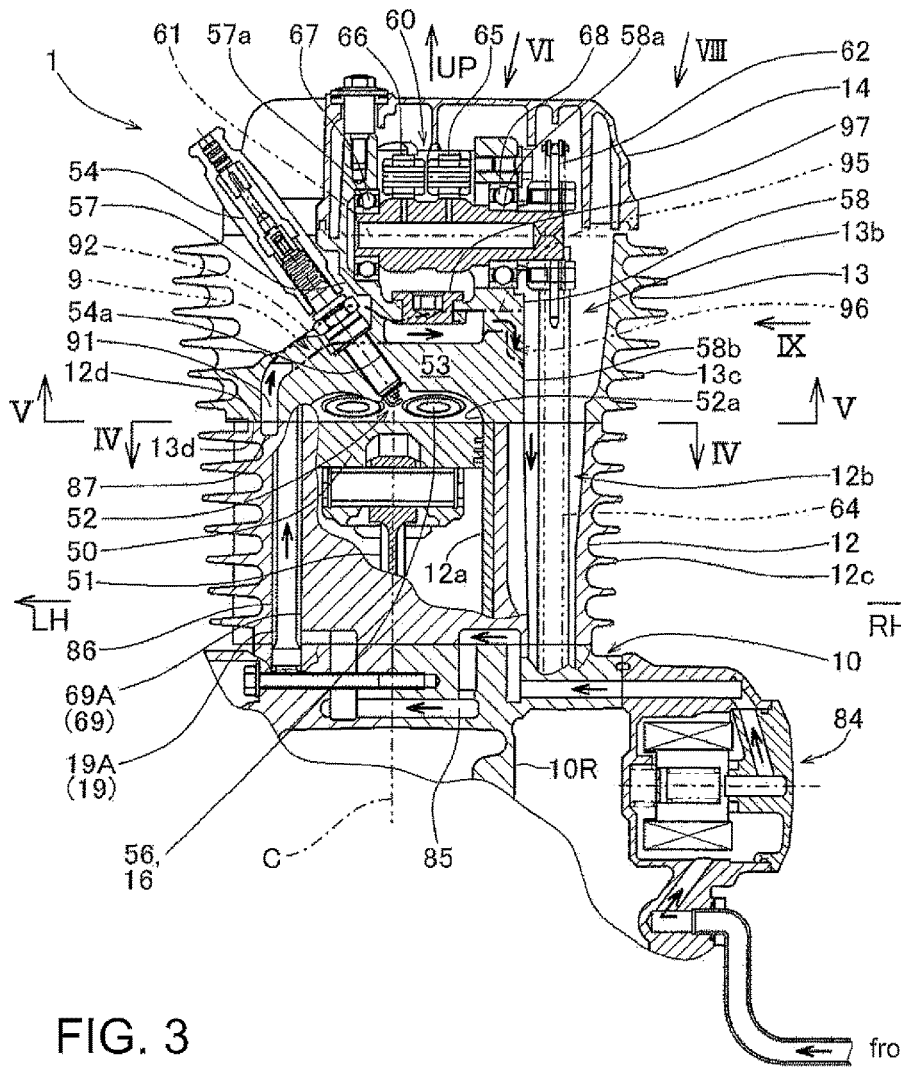
FIG. 3
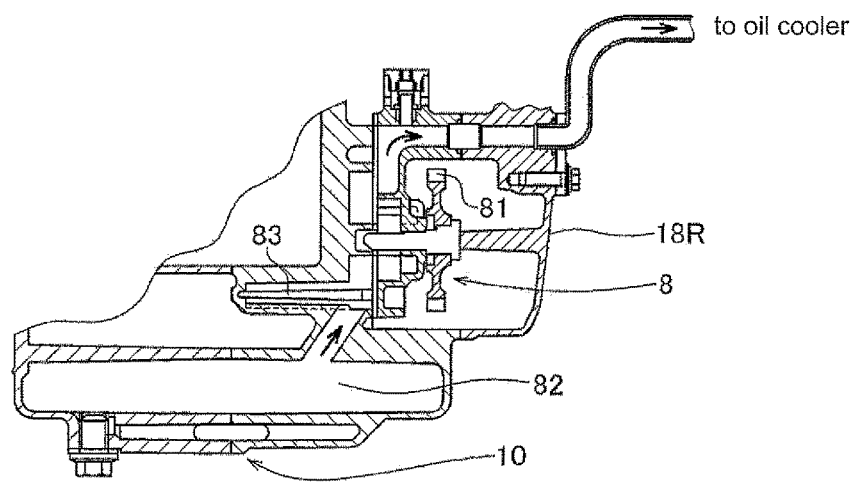
from oil cooler
to oil cooler

AIR/OIL-COOLED INTERNAL COMBUSTION ENGINE

BACKGROUND OF THE INVENTION

Field of the Invention

The present invention relates to an air/oil-cooled internal combustion engine whose temperature is detected with oil having cooled a cylinder head.

Description of Related Art

For example, Patent Documents Japanese Patent Application Publication No. 2013-072353 (FIGS. 3 to 11) and Japanese Patent Application Publication No. 2012-215172 (FIGS. 2 to 16) describe an air/oil-cooled internal combustion engine including: cooling fins which are provided on the circumferences of a cylinder block and a cylinder head; and a cooling passage which is provided in a combustion chamber upper wall covering a combustion chamber of the cylinder head and is used for cooling the combustion chamber upper wall with lubrication oil.

In the internal combustion engine described in Japanese Patent Application Publication No. 2013-072353 and Japanese Patent Application Publication No. 2012-215172, oil having cooled the cylinder head is directly sent back to an oil pan portion after passing through a cooling passage.

Meanwhile, accurate detection of a warm-up condition of an internal combustion engine has been requested for the air intake control during the warm-up operation. However, detection of the temperature of an internal combustion engine has been heretofore carried out by collecting lubrication oil having dripped from a valve system of a cylinder head and detecting the temperature of this oil with a temperature sensor.

In view of the above existing technique, a challenge of the present invention is to provide an air/oil-cooled internal combustion engine capable of increasing accuracy in detection of the temperature of the air/oil-cooled internal combustion engine by a temperature sensor and carrying out the warm-up operation after the start-up of the air/oil-cooled internal combustion engine favorably.

SUMMARY OF THE INVENTION

In order to solve the above challenge, the present invention provides an air/oil-cooled internal combustion engine including: cooling fins that are provided on the circumferences of a cylinder block and a cylinder head; and a cooling passage that is provided in a combustion chamber upper wall covering a combustion chamber of the cylinder head and is used for cooling the combustion chamber upper wall with lubrication oil. The air/oil-cooled internal combustion engine has a temperature sensor configured to detect the temperature of the air/oil-cooled internal combustion engine by detecting a temperature of oil. The temperature sensor is provided to face a cooling oil outlet portion of the cooling passage.

Accordingly the temperature of oil having passed through the cooling passage of the combustion chamber upper wall is detected directly at the cooling oil outlet portion of the cooling passage. This makes it possible to increase accuracy in detection of the temperature of the air/oil-cooled internal combustion engine by the temperature sensor, and carry out the warm-up operation after the start-up of the air/oil-cooled internal combustion engine favorably.

In further accordance with the present invention, the air/oil-cooled internal combustion engine includes a cam chain chamber that houses therein a cam chain configured to drive a valve train provided in the cylinder head. The cooling oil outlet portion of the cooling passage is disposed close to a cam chain tensioner configured to adjust the looseness of the cam chain. The temperature sensor is mounted so that the temperature sensor penetrates the cylinder head in the same direction as a tensioner lifter configured to press the cam chain tensioner and faces the cam chain chamber.

By disposing the temperature sensor at the back of the cam chain tensioner, the temperature sensor and the cooling oil outlet portion can be made close to each other easily by use of a back space of the cam chain tensioner and the temperature sensor can be disposed near the cooling oil outlet portion, whereby accuracy in detection of the temperature of the air/oil-cooled internal combustion engine by the temperature sensor can be increased reliably.

In further accordance with the present invention, a tip temperature detecting unit of the temperature sensor is located inside an oil pooling portion, which is made by partitioning the inside of the cam chain chamber with a partition rib portion provided in the cylinder head, and the partition rib portion is connected to the cooling oil outlet portion.

Accordingly, oil having flowed from the cooling oil outlet portion is guided to the oil pooling portion via the partition rib portion. Thus, the tip temperature detecting unit of the temperature sensor located inside the oil pooling portion can detect the oil temperature reliably and the tip temperature detecting unit is protected by the partition rib portion, whereby accuracy in detection of the temperature of the air/oil-cooled internal combustion engine can be further increased and the warm-up operation can be carried out favorably.

In further accordance with the present invention, the air/oil-cooled internal combustion engine is mounted in a motorcycle, and includes the cam chain chamber at a position opposite a side stand of the motorcycle in the vehicle widthwise direction with respect to a cylinder axis.

Therefore, even when the temperature sensor is located on one side being a high position opposite the side stand side while the side stand is in use, oil gushing out of the cooling oil outlet portion is collected inside the oil pooling portion and its temperature is detected there. Thereby, the warm-up operation can be carried out accurately regardless of whether the motorcycle tilts leftward/rightward, which provides large flexibility in design of the air/oil-cooled internal combustion engine mounted in the motorcycle.

In further accordance with the present invention, the cylinder axis of the air/oil-cooled internal combustion engine tilts slightly forward, and an intake system and the temperature sensor are arranged on the rear side of the internal combustion engine.

As such, oil returned from the cooling passage is easy to separate. Thus, even when the temperature sensor is disposed in the rear sidewall being a downward-directed inner surface of the cam chain chamber where the returned oil is hard to collect, it is possible to detect the temperature of oil gushing out of the cooling oil outlet portion by collecting the oil in the oil pooling portion. In addition, since the temperature sensor is disposed on the rear side, the temperature sensor is protected, and the temperature sensor can be disposed away from a high temperature portion of an exhaust system located on the front side of the internal combustion engine with respect to the cylinder axis, whereby accuracy in detection by the temperature sensor can be further increased and the warm-up operation can be carried out favorably.

In further accordance with the present invention, the cooling passage in the combustion chamber upper wall of the cylinder head includes multiple oil feed side inlet openings that communicate with an oil feed passage of the cylinder block, includes inside the combustion chamber upper wall multiple oil passages that are led from the multiple inlet openings and pass through the periphery of an ignition plug, and includes a communicating passage that couples the multiple oil passages to each other at a position downstream of the inlet openings.

In the multiple inlet openings to be fed with oil from the oil feed passage, the sizes of the inlet openings can be set so that the amounts of oil to flow through these openings may balance with each other, and the communicating passage can smoothen the imbalance in the flow of oil caused by reasons such as the number of revolutions of the air/oil-cooled internal combustion engine and feed the oil thus smoothened to the multiple oil passages downstream.

Thus, it is possible to uniformly cool the periphery of a plug installation hole of the ignition plug in the combustion chamber upper wall and the periphery of a combustion chamber-side opening of an exhaust port where a high thermal load is applied and thus to stabilize the temperature of oil output through the cooling oil outlet portion of the cooling passage, whereby accuracy in detection by the temperature sensor can be further increased and the warm-up operation can be carried out favorably.

BRIEF DESCRIPTION OF THE DRAWINGS

These and further features of the invention will be apparent with reference to the following description and drawings, wherein:

FIG. 3 is a sectional development view of the air/oil-cooled internal combustion engine which is roughly the combination of views seen from arrows $III_1$-$III_1$, arrows $III_2$-$III_2$, and arrows $III_3$-$III_3$ in FIG. 2.

DETAILED DESCRIPTION OF THE INVENTION

Figure 1:
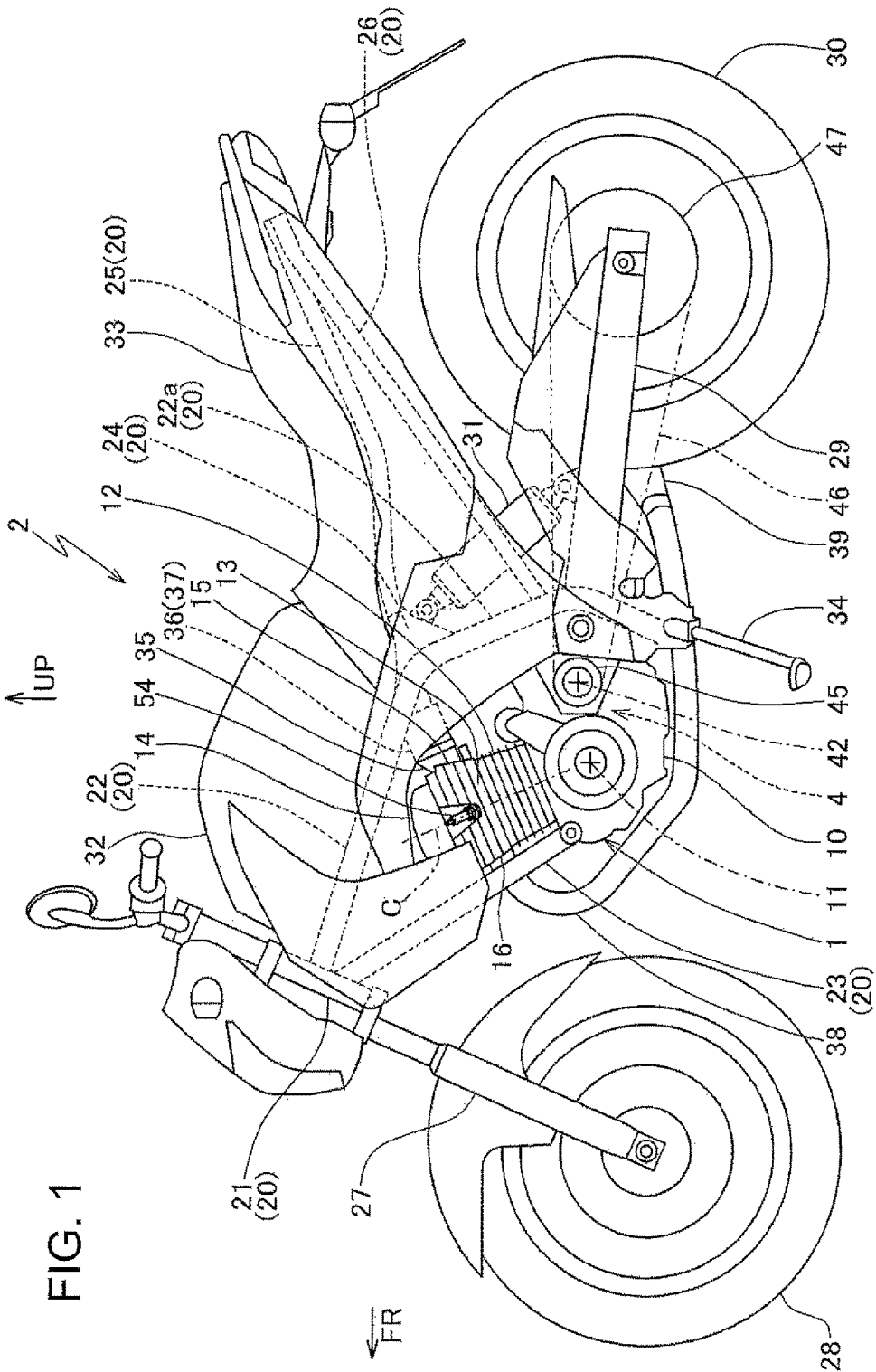
FIG. 1 is a schematic left side view of a motorcycle equipped with an air/oil-cooled internal combustion engine according to an embodiment of the present invention.

An air/oil-cooled internal combustion engine according to an embodiment of the present invention is described based on FIGS. 1 to 9.

In this embodiment, the air/oil-cooled internal combustion engine is an air/oil-cooled internal combustion engine installed in a motorcycle, and directional terms such as front, rear, left, right, up, and down in the scope of claims and the description of this specification are the same as directions of a vehicle (motorcycle) equipped with the air/oil-cooled internal combustion engine of this embodiment.

In the drawings, an arrow FR indicates the front side of the vehicle, an arrow LH indicates the left side of the vehicle, an arrow RH indicates the right side of the vehicle, and an arrow UP indicates the upper side of the vehicle.

Figure 6:
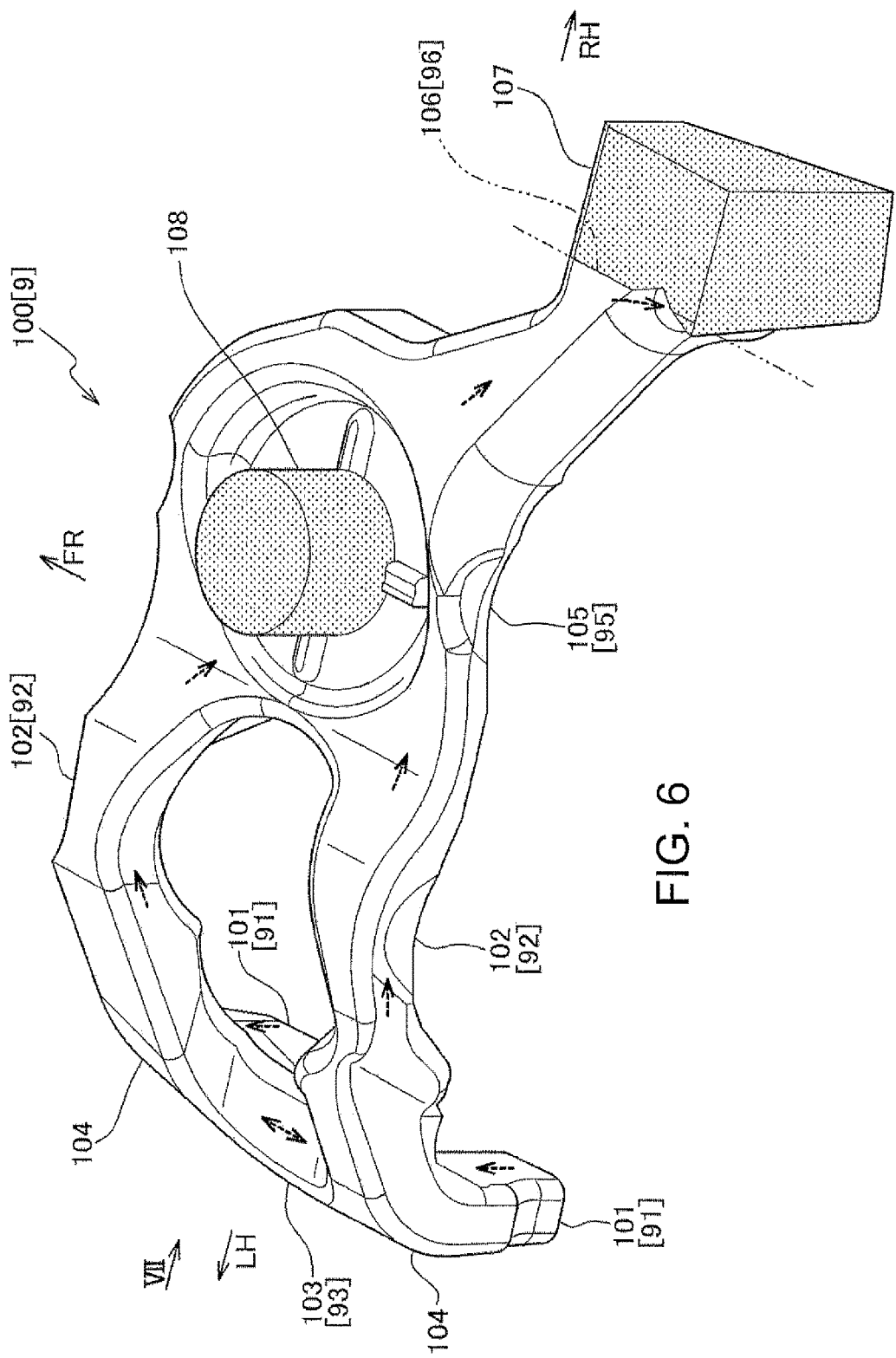
FIG. 6 is a perspective view illustrating the shape of the cooling passage seen from an arrow VI in FIGS. 3, 4, and 5 by means of a cooling passage core used for forming the cooling passage at the time of casting the cylinder head.
Figure 7:
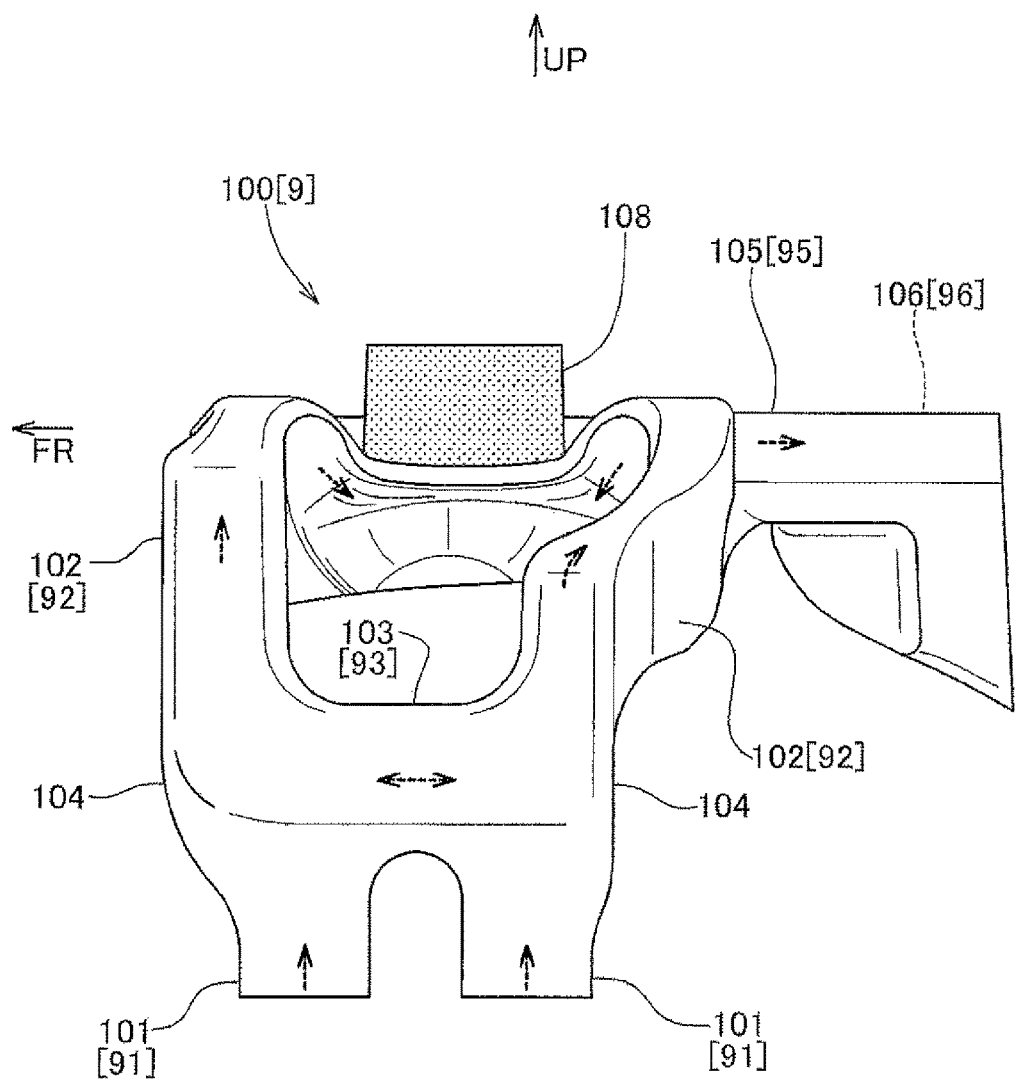
FIG. 7 is a left elevation view of the cooling passage core seen from an arrow VII in FIG. 6.

In addition, black small arrows added in the drawings schematically indicate the flow of oil in this embodiment according to the present invention. In FIGS. 6 and 7, the flow of oil is schematically illustrated with a cooling passage core regarded as a cooling passage.

FIG. 1 illustrates an air/oil-cooled internal combustion engine (hereinafter simply referred to as "internal combustion engine") 1 of this embodiment installed in a motorcycle 2.

The internal combustion engine 1 according to this embodiment is a single-cylinder, SOHC, 4-valve, 4-stroke-cycle, air/oil-cooled internal combustion engine which constitutes a power unit integrally including a transmission 4 (see FIG. 2) in a rear part of its crankcase 10 and which is installed in the motorcycle 2 with its crankshaft 11 oriented in the vehicle widthwise direction of the motorcycle 2, i.e., in the lateral direction.

As illustrated in FIG. 1, in a body frame 20 of the motorcycle 2 equipped with the internal combustion engine 1 according to this embodiment, left and right main frames 22 extends rearward from a head pipe 21 while tilting slightly downward and then bend further downward and form steep portions 22a until reaching its lower end part.

In addition, left and right down frames 23 extend obliquely downward at a sharp angle from the head pipe 21 substantially in parallel with the steep portions 22a of the main frames 22 in the side view.

A pair of seat rails 25 extends rearward from upper parts of the steep portions 22a of the main frames 22 via gussets 24, and a pair of back stays 26, which couple the seat rails 25 and lower parts of the steep portions 22a to each other, supports the seat rails 25.

In the body frame 20 described above, a pair of front forks 27 is pivotally supported on the head pipe 21, and a front wheel 28 is axially supported by the lower ends of the front forks.

A pair of rear forks 29, which are supported at their front ends by the lower parts of the steep portions 22a of the main frames 22 extends rearward, a rear wheel 30 is axially supported by the rear ends of the rear forks, and a pair of rear cushions 31 is interposed between the rear forks 29 and the gussets 24 of the body frame 20.

A fuel tank 32 is hung on front parts of the main frames 22, and a seat 33 is provided behind the fuel tank 32 while being supported by the seat rails 25.

In addition, in this embodiment, the steep portion 22a of the left main frame 22 has a side stand 34 at its lower end part and, in the state where the side stand is located at a lower position as illustrated in the drawing, it enables the motorcycle 2 to be stopped and parked while tilting slightly leftward.

The internal combustion engine 1 suspended by the main frames 22 and the down frames 23 has a configuration integrally including the transmission 4 (see FIG. 2) as described above, and is suspended in such a posture that a cylinder block 12, a cylinder head 13, and a cylinder head cover 14 stand on the crankcase 10 with a cylinder axis C tilting slightly forward.

An intake pipe 35 extends rearward from the cylinder head 13 of the internal combustion engine 1 with a pair of intake ports 15 of the intake pipe connected in between, and is provided with a throttle body 36 and an intake system 37 such as an air cleaner (not illustrated).

An exhaust pipe 38 extends forward from the cylinder head 13 with a pair of exhaust ports 16 of the exhaust pipe connected in between, and is then bent downward and extends rearward below the internal combustion engine 1 until it reaches a muffler 39 located at the right side of the rear wheel 30.

Figure 2:
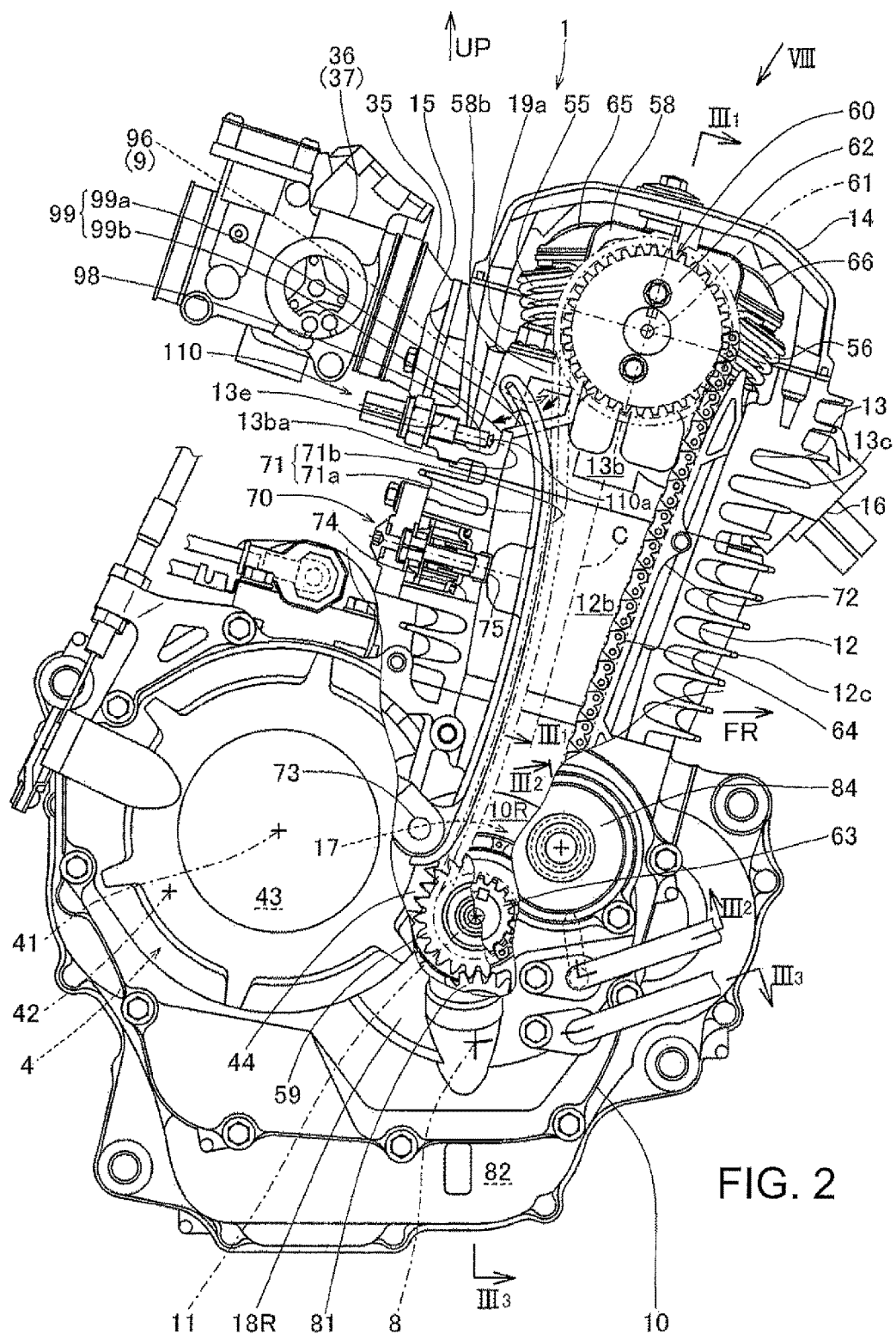
FIG. 2 is a partially sectional right side view of the air/oil-cooled internal combustion engine extracted from FIG. 1.

As illustrated in FIG. 2, the crankcase 10 of the internal combustion engine 1 axially supports the crankshaft 11, and houses the transmission 4 at a position behind a crank chamber 17 where the crankshaft 11 is disposed.

On top of the crank chamber 17 located on the front side of the crankcase 10, the cylinder block 12 having a single cylinder bore 12a (see FIG. 3) and the cylinder head 13 being laid on top of the cylinder block 12 via a gasket (not illustrated) are laid, the cylinder head 13 and the cylinder block 12 are fastened together to the crankcase 10 with stud bolts 19 (see FIG. 3), and the cylinder head 13 is covered with the cylinder head cover 14 from above.

A set of the cylinder block 12, the cylinder head 13, and the cylinder head cover 14, which are laid on a front portion of the crankcase 10, extends upward from the crankcase 10 in a slightly forward-tilting posture.

As illustrated in FIG. 3, a piston 50 is fitted in the cylinder bore 12a of the cylinder block 12 so as to be slidable in a reciprocating manner in the cylinder bore and the piston 50 and the crankshaft 11 (see FIG. 2) are connected to each other with a connecting rod 51, which constitutes a crank mechanism.

In a lower part of the cylinder head 13, a combustion chamber 52, which defines a combustion chamber circumferential wall 52a matching the cylinder bore 12a and is covered with a combustion chamber upper wall 53, is formed opposite the piston 50 in the cylinder bore 12a.

In the combustion chamber upper wall 53, the pair of exhaust ports 16 (see FIG. 5) which are open in the combustion chamber 52 and designed to be opened/closed by a pair of exhaust valves 56 (see FIG. 2) extends forward, the pair of intake ports 15 (see FIG. 5), which are designed to be opened/closed by a pair of intake valves 55 (not illustrated in FIG. 3, see FIG. 2), extends rearward, and an ignition plug 54, which faces the inside of the combustion chamber 52, is mounted.

The cylinder head 13 mounts and houses therein a valve train 60 composed of: parts such as a valve camshaft 61 designed to drive the intake valves 55 and the exhaust valves 56 to open/close, a driven cam chain sprocket 62, an intake rocker arm 65, and an exhaust rocker arm 66; and support members for these parts.

Cam chain chambers 12b, 13b, which house therein a cam chain 64 designed to drive the valve train 60, are provided in the cylinder block 12 and the cylinder head 13 on the right side thereof in the vehicle widthwise direction with respect to the cylinder axis C (outer portion).

Figure 8:
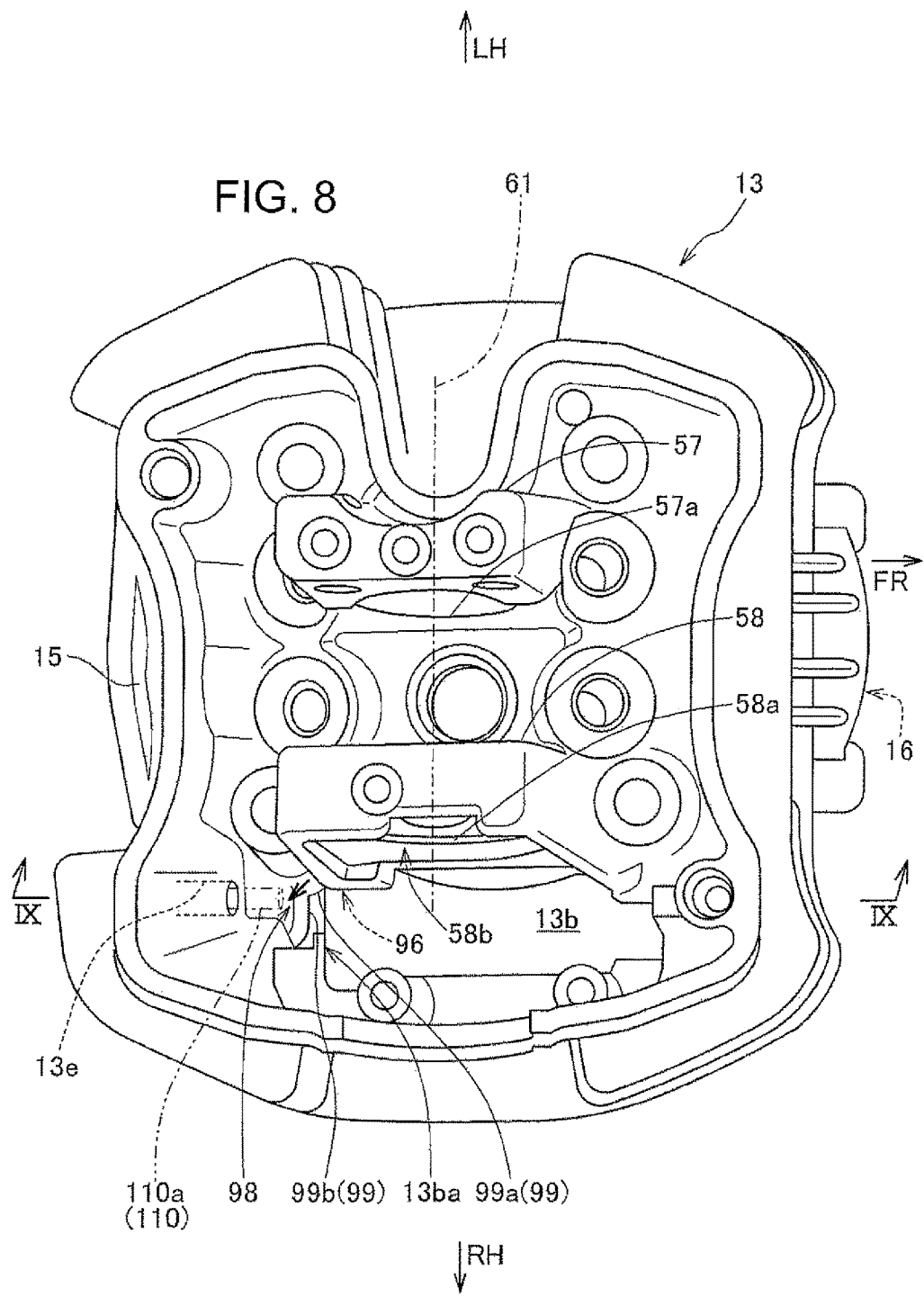
FIG. 8 is a perspective view of an upper surface of the cylinder head seen from an arrow VIII in FIGS. 2 and 3.
Figure 9:
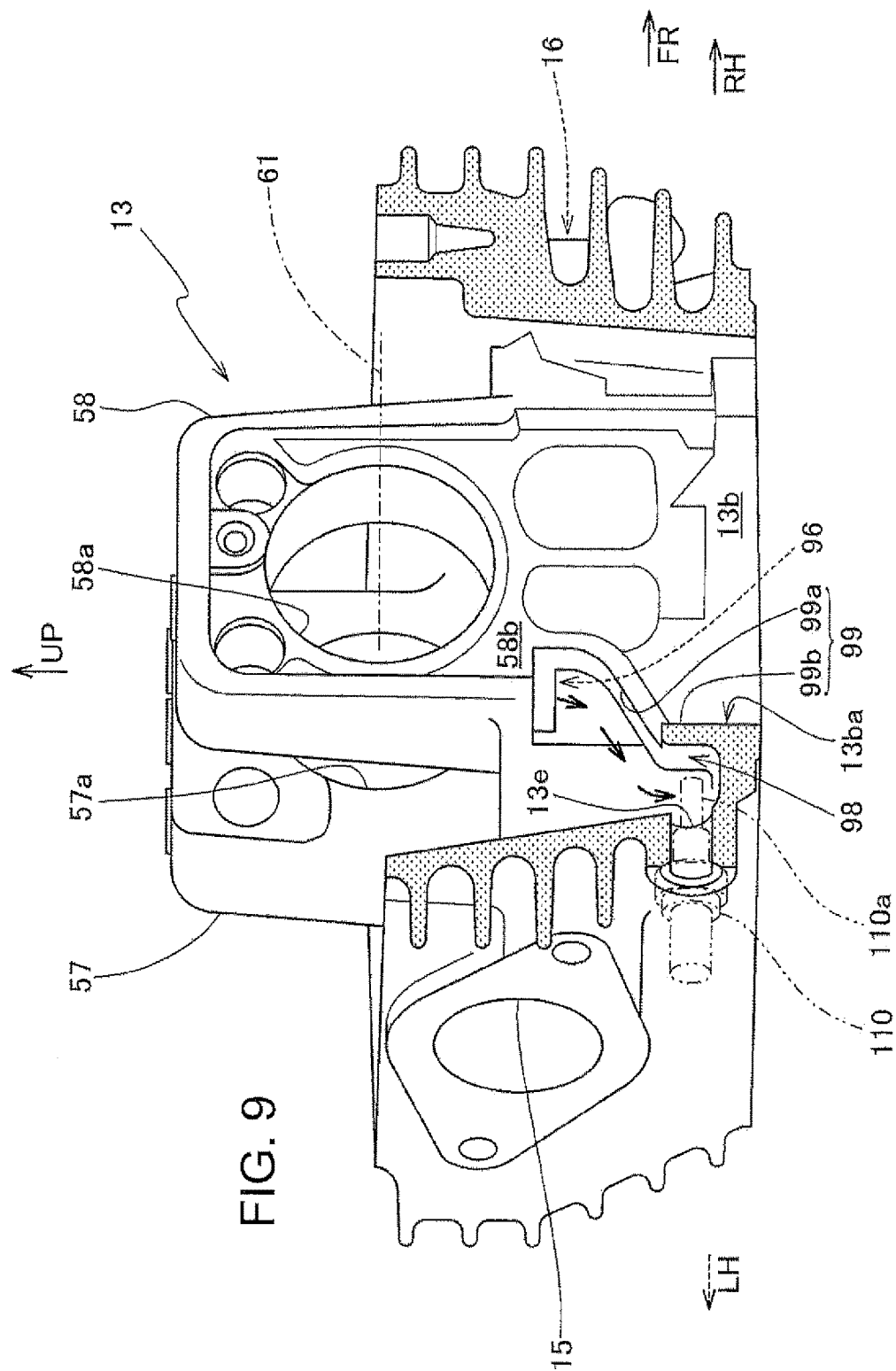
FIG. 9 is a right side sectional view of the cylinder head seen from arrows IX-IX in FIGS. 3, 5, and 8.

Specifically, a right support wall 58, which stands to face the cam chain chamber 13b, and a left support wall 57, which stands to get around the ignition plug 54 mounted in a plug installation hole 54a, are integrally formed on an upper part of the combustion chamber upper wall 53 of the cylinder head 13, and the valve camshaft 61 is supported in parallel with the crankshaft 11 by a left bearing 67, which is fitted in a left bearing support hole 57a of the left support wall 57, and a right bearing 68, which is fitted in a right bearing support hole 58a of the right support wall 58 (see FIGS. 8 and 9).

As illustrated in FIG. 2, the cam chain 64 is threaded through the cam chain chambers 12b, 13b and spans the driven cam chain sprocket 62, which is fitted on the valve camshaft 61 of the valve train 60, and a drive cam chain sprocket 63, which is fitted on the crankshaft 11, the valve camshaft 61 is rotated at the number of revolutions half of the crankshaft 11 to swing the intake rocker arm 65 and the exhaust rocker arm 66 and drive them to open/close the intake valves 55 and the exhaust valves 56 at their required timings.

A fixed cam chain guide 72 made of a synthetic resin and designed to guide the cam chain 64 is provided at one side of the cam chain 64 where the cam chain is drawn by the drive cam chain sprocket 63 (a front side in the advancing direction). In order to prevent the loosening of the cam chain 64, a cam chain tensioner 71 pressed by a tensioner lifter 70 is provided at the other side of the cam chain 64 where the cam chain is pushed out from the drive cam chain sprocket 63 (a rear side in the advancing direction).

The cam chain tensioner 71 is formed from: an arm 71a, which is made of an elastic material; and a shoe 71b, which is made of a synthetic resin and attached to the arm 71a on one side thereof on which the chain slides. The cam chain tensioner 71 has a lower end, which is swingably supported by a fixed tensioner lower end bolt 73, and an upper end, which is a free end. The cam chain tensioner 71 is formed to curve slightly in order to press it against the cam chain 64 on its loosening side.

On a tensioner lifter mounting portion 74 located in a rear part of the cylinder block 12, the tensioner lifter 70 is mounted to penetrate the cylinder block 12 in the forward direction. A protruding shaft 75 at the center of the tensioner lifter enters the cam chain chamber 12b and presses the cam chain tensioner 71 against the cam chain 64 to reduce the loosening and oscillation of the cam chain 64.

A primary drive gear 59 as well as the drive cam chain sprocket 63 are fitted in a portion of the crankshaft 11, which protrudes leftward of a right bearing wall 10R of the crankcase 10, and a right case cover 18R covers this fitted part on its right side.

As illustrated in FIG. 2, a main shaft 41 and a counter shaft 42 of the transmission 4 are laid across the rear part of the crankcase 10 at a position behind the crankshaft 11 so that they are oriented in the lateral direction and rotatable in parallel with each other, and a main gear group (not illustrated) axially supported by the main shaft 41 and a counter gear group (not illustrated) axially supported by the counter shaft 42 constantly mesh with each other to constitute the transmission 4.

A multiple-disc friction type shift clutch 43 is provided on a right part of the main shaft 41, which protrudes rightward of the right bearing wall 10R of the crankcase 10.

An outer clutch (not illustrated) of the shift clutch 43 is supported by a primary driven gear 44, which is axially and rotatably supported by the main shaft 41, and is configured to engage/disengage an inner clutch (not illustrated), which is integrally fitted on the main shaft 41.

The shift clutch 43 is configured not to transmit rotational power from the crankshaft 11 to the transmission 4 during the change of gears of the transmission 4, and to transmit rotational power from the crankshaft 11 to the main shaft 41 of the transmission 4 as soon as the change of the gears of the transmission 4 is over.

As illustrated in FIG. 1, the counter shaft 42 penetrates the crankcase 10 to the left and protrudes to the outside to constitute the final output shaft 42 of the internal combustion engine 1, and an output sprocket 45 is spline-fitted on this protruding portion.

A drive chain 46 wound around the output sprocket 45 spans a driven sprocket 47 on the rear wheel 30 side, which constitutes a chain transmission mechanism and transmits power to the rear wheel 30.

In the internal combustion engine 1 of this embodiment described above, the cylinder block 12 and the cylinder head 13 are basically air cooled by cooling fins 12c, 13c respectively formed on their circumferences.

However, since the periphery of the plug installation hole 54a for the ignition plug 54 and the periphery of combustion chamber-side openings 16a (see FIG. 5) for the exhaust ports 16 in the combustion chamber upper wall 53 covering the combustion chamber 52 of the cylinder head 13 are located in the combustion chamber upper wall 53 deep inside the cylinder head, these portions are hard to cool and sometimes cannot be cooled enough depending on a load increase such as an increase of the compression ratio of the internal combustion engine 1.

To deal with this, in order to cool the high temperature portions of the cylinder head 13 enough, the internal combustion engine 1 of this embodiment is provided with a head-side cooling oil passage (hereinafter simply referred to as a "cooling passage") 9 in the combustion chamber upper wall 53 to allow a part of lubrication oil to circulate therethrough as cooling oil.

As illustrated in FIGS. 2 and 3, the primary drive gear 59 of the crankshaft 11 meshes with a driven gear 81 of an oil pump 8, which is provided between the right bearing wall 10R of the crankcase 10 and the right case cover 18R.

In addition, as illustrated in FIG. 3, the oil pump 8 absorbs lubrication oil through a strainer 83 from an oil pan portion 82 located in a lower part of the crankcase 10, and the oil discharged from the oil pump 8 is sent to an oil cooler (not illustrated) located outside the crankcase 10.

The oil cooled through the oil cooler passes through an oil filter 84 provided inside the right case cover 18R and is then fed to various parts inside the internal combustion engine 1 through an oil passage 85 formed in the crankcase 10 and the cylinder block 12. The oil thus fed is partially sent to the cylinder head 13 through an oil feed passage 86, which is a bolt hole clearance portion between the outer surface of a predefined stud bolt 19A and the inner surface of a predefined stud bolt hole 69A into which this stud bolt is inserted, to be used for lubrication and cooling of the valve train 60 in the cylinder head 13.

Figure 4:
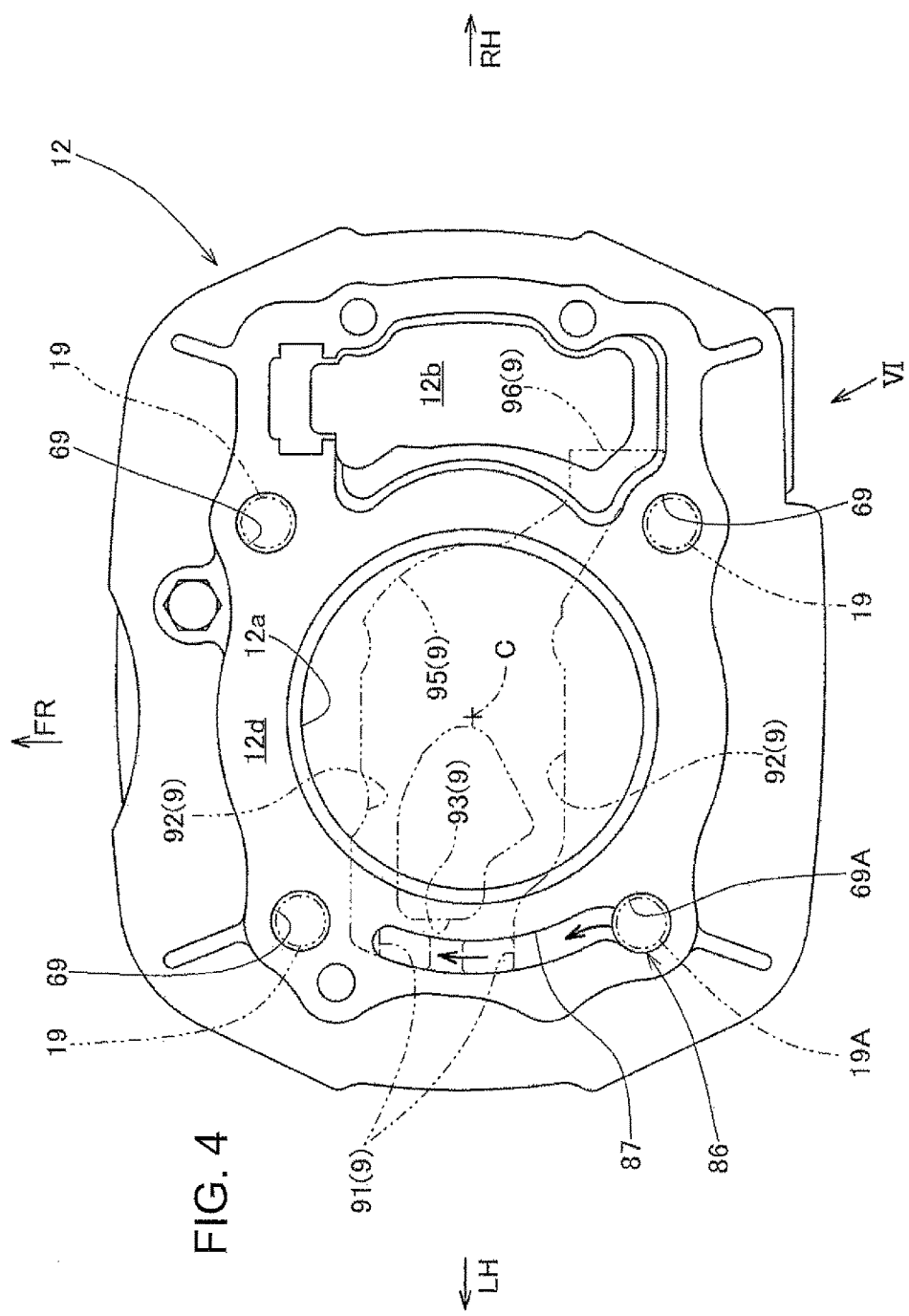
FIG. 4 is a top view of a cylinder block seen from arrows IV-IV in FIG. 3, in which a cooling passage inside the cylinder head laid over the cylinder block is illustrated with a chain double-dashed line superimposed on the original image.
Figure 5:
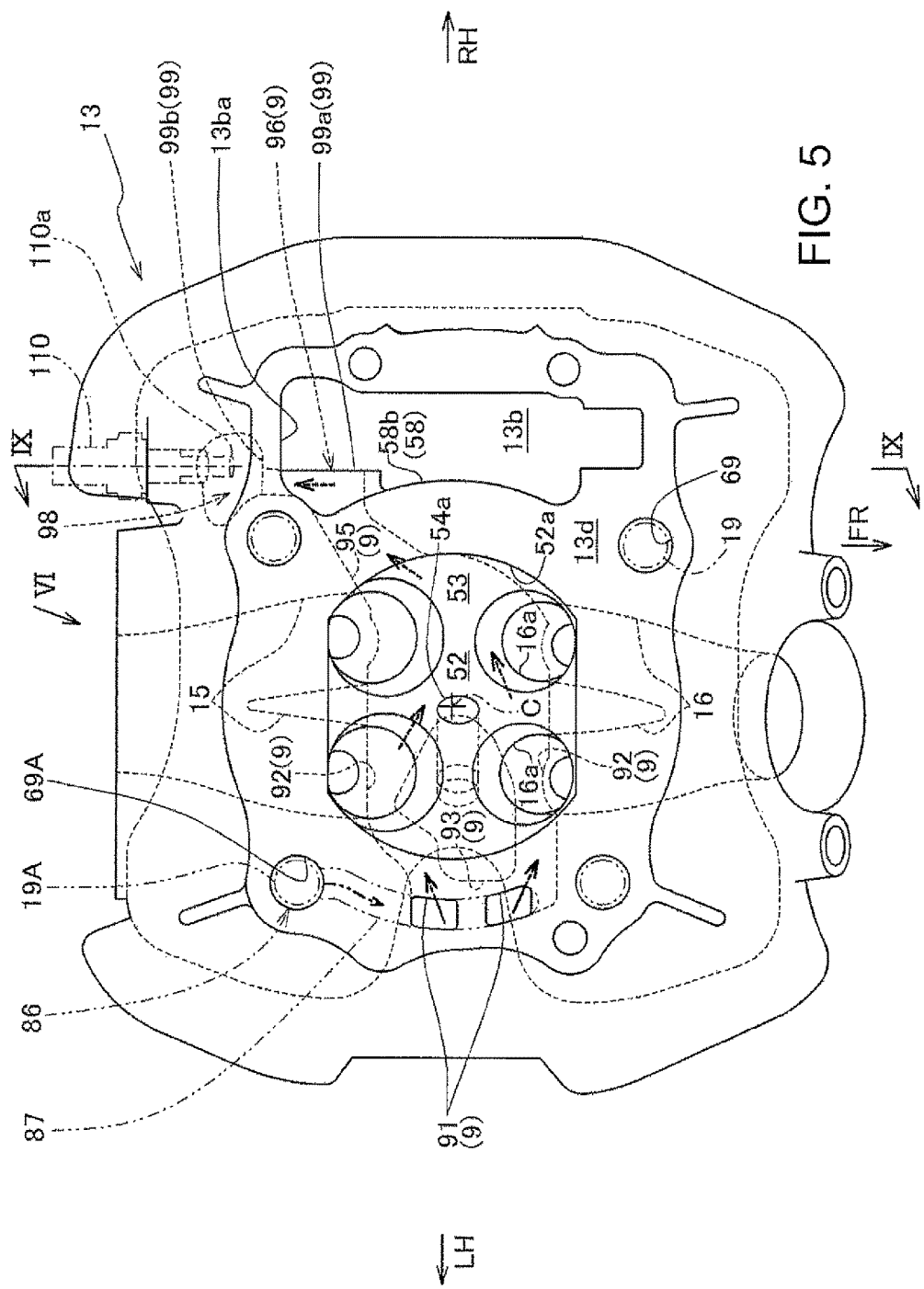
FIG. 5 is a bottom view of the cylinder head seen from arrows V-V in FIG. 3, in which the cooling passage in an upper wall of a combustion chamber of the cylinder head is illustrated with a broken line and a temperature sensor provided in the cylinder head is illustrated with a chain double-dashed line.

As illustrated in FIGS. 4 and 5, the stud bolts 19, which jointly fasten the cylinder block 12 and the cylinder head 13 to the crankcase 10, are inserted from top to bottom through stud bolt holes 69, which are bored in each of the cylinder block 12 and the cylinder head 13 so as to surround the cylinder bore 12a and the combustion chamber 52, and fastened to the crankcase 10, and nuts 19a (FIG. 2) are fastened to their respective upper ends.

In this embodiment, the number of the stud bolt holes 69 is four, and the bolt hole clearance portion between the predefined stud bolt hole 69A being one of these holes on the rear left side and the predefined stud bolt 19A inserted through this predefined stud bolt hole constitutes the oil feed passage 86 described above.

Meanwhile, as illustrated in FIG. 3, the combustion chamber upper wall 53 of the combustion chamber 52 is formed in the lower part of the cylinder head 13, and the cooling passage 9 provided inside the combustion chamber upper wall 53 communicates with the oil feed passage 86 so as to branch from the oil feed passage.

Specifically, as illustrated in FIG. 4, in a mating surface 12d of the cylinder block 12 with the cylinder head 13, which is the upper surface of the cylinder block, an oil groove 87 is formed to extend continuously from the predefined stud bolt hole 69A described above and extend forward on the periphery of the cylinder bore 12a to a position before the stud bolt hole 19 on the front left side. As the cooling passage 9 inside the cylinder head 13 is illustrated in the drawing with a chain double-dashed line superimposed on the original image, two inlet openings 91 of the cooling passage 9 are located at a position matching that of the oil groove 87.

Accordingly, oil sent through the oil feed passage 86 diverges at the mating surface 12d of the cylinder block 12, and partially flows to the oil groove 87 and then flows into the cooling passage 9 in the cylinder head 13 through the two inlet openings 91.

FIG. 5 is a view of the cylinder head 13 as seen from the bottom. The two inlet openings 91 of the cooing passage 9 open in a mating surface 13d of the cylinder head 13 with the cylinder block 12 which is the lower surface of the cylinder head, and these openings respectively lead to and communicate with two oil passages 92, which are provided inside the combustion chamber upper wall 53 so as to pass through the periphery of the plug installation hole 54a of the ignition plug 54.

In addition, a communicating passage 93, which couples the two oil passages 92 to each other, is provided at the downstream side of the two inlet openings 91.

Hence, in the two inlet openings 91 into which oil is supplied through the oil feed passage 86, the sizes of the inlet openings 91 can be set so that the amounts of oil to flow through these openings may balance with each other. Besides, the communicating passage 93 can smoothen the imbalance in the flow of oil caused by reasons such as the number of revolutions of the internal combustion engine 1 and feed the oil thus smoothened to the two oil passages 92 downstream.

Note that the number of each of the inlet openings 91 and the oil passages 92 is not limited to two as in this embodiment, and they may be arranged at any preferable number of spots.

FIG. 6 is a perspective view illustrating the shape of the cooling passage 9 seen from an arrow VI in FIGS. 3, 4, and 5 by means of a cooling passage core 100 used for forming the cooling passage 9 at the time of casting the cylinder head 13. FIG. 7 is a left elevation view of the cooling passage core 100 seen from an arrow VII in FIG. 6.

Parts of the cooling passage core 100 in FIGS. 6 and 7 are each added with the reference numeral of the corresponding part of the cooling passage 9 with square brackets.

In FIGS. 6 and 7, the cooling passage core 100 includes: two inlet passage forming portions 101, which form the two inlet openings 91; two oil passage forming portions 102, which are connected to each of the two inlet passage forming portions 101 and form the two oil passages 92 arranged to pass through the periphery of the plug installation hole 54a of the ignition plug 54; and a communicating passage forming portion 103, which couples connection portions 104 of the two inlet passage forming portions 101 and oil passage forming portions 102 and forms the communicating passage 93.

Since the two oil passages 92 of the cooling passage 9 extend downstream, i.e., rightward above a portion between the pair of intake ports 15 on the rear side and the pair of exhaust ports 16 on the front side and meet to form a junction oil passage 95 as illustrated in FIG. 5, the two oil passage forming portions 102 also extend rightward and meet to form a junction oil passage forming portion 105.

Since the junction oil passage 95 of the cooling passage 9 is bent while being tapered toward the rear right part and its downstream end forms a cooling oil outlet portion 96 that opens to the inside of the cam chain chamber 13b of the cylinder head 13 as illustrated in FIG. 5, the junction oil passage forming portion 105 of the cooling passage core 100 is also bent while being tapered toward the rear right part to form a cooling oil outlet forming portion 106, and a core print portion 107 is connected to the tip of the cooling oil outlet forming portion 106. The core print portion 107 is an extension portion used for fixing the core during casting, and in the case of this embodiment, it forms a part of a space inside the cam chain chamber 13b at the time of casting.

In FIG. 6, a columnar portion 108, which protrudes substantially at the center of the cooling passage core 100, is one for providing a through hole used for ejecting a core member out of the cylinder head 13 having been cast and mounting a sealing bolt 97 (see FIG. 3) therein.

In the cooling passage 9 formed inside the combustion chamber upper wall 53 of the cylinder head 13 by the cooling passage core 100 described above, as illustrated in FIGS. 4 and 5, its cooling oil outlet portion 96 opens in a cam chain chamber-side side surface 58b (see FIG. 3) of the right support wall 58 of the cylinder head 13 in a rear part of the cam chain chamber 13b formed in the cylinder head 13 on the right side thereof in the vehicle widthwise direction with respect to the cylinder axis C (outer portion).

As FIGS. 8 and 9 three-dimensionally illustrate the above state, the cam chain chamber-side side surface 58b of the right support wall 58 of the cylinder head 13 is provided with a guide rib 99a of partition rib portions 99, which is connected to the cooling oil outlet portion 96 and extends obliquely downward, and a rear sidewall 13ba of the cam chain chamber 13b is provided with a dam-shaped rib 99b of the partition rib portions 99, which stands continuously from the guide rib 99a to form an oil pooling portion 98 directed upward.

Accordingly, oil having flowed from the cooling oil outlet portion 96 passes through the guide rib 99a of the partition rib portions 99 to be guided to the oil pooling portion 98, which is surrounded by the dam-shaped rib 99b of the partition rib portions 99 located in the obliquely rear lower part.

Meanwhile, the internal combustion engine 1 of this embodiment is provided with a temperature sensor 110 for detecting the temperature of the internal combustion engine 1 by detecting the temperature of oil having cooled the cylinder head 13, and the air intake control during the warm-up operation of the engine is carried out according to a detection signal from the temperature sensor.

A signal on the oil temperature detected by the temperature sensor 110 is sent to an engine control unit (ECU) (not illustrated). Based on this oil temperature signal, the engine control unit controls the amount of intake air to be fed to the combustion chamber during the warm-up of the internal combustion engine 1, for example, to increase/decrease the idle speed at the time of start-up of the internal combustion engine 1.

Specifically, if the oil temperature is lower than a predefined temperature, the engine control unit judges that the warm-up of the internal combustion engine 1 is needed and thus increases the amount of intake air to increase the idle speed (so-called "fast idle"). On the other hand, if the oil temperature becomes equal to or higher than the predefined temperature, the engine control unit judges that the warm-up of the internal combustion engine 1 is over and decreases the amount of intake air to set the idle speed back to the normal speed.

As illustrated in FIG. 2, the cooling oil outlet portion 96 of the cooling passage 9 is disposed close to the cam chain tensioner 71 configured to adjust the looseness of the cam chain 64. Meanwhile, the temperature sensor 110 is mounted so that it penetrates the cylinder head 13 through a sensor mounting hole 13e in the same direction as the tensioner lifter 70 configured to press the cam chain tensioner 71 and faces the cam chain chamber 13b.

In addition, a tip temperature detecting unit 110a of the temperature sensor 110 is located inside the oil pooling portion 98, which is made by partitioning the inside of the cam chain chamber 13b with the partition rib portions 99 provided in the cylinder head 13.

In this way, the temperature sensor 110 configured to detect the temperature of the internal combustion engine 1 by detecting the temperature of oil having passed through the cooling passage 9 of the combustion chamber upper wall 53, which indicates the temperature of the combustion chamber upper wall 53, i.e., the temperature of the internal combustion engine 1, is provided to face the cooling oil outlet portion 96 of the cooling passage 9, and thus the temperature of oil is detected directly at the cooling oil outlet portion 96. This makes it possible to increase accuracy in detection of the temperature of the internal combustion engine 1 by the temperature sensor 110, control the increase/decrease of the amount of intake air adequately and without delay, and carry out the warm-up operation after the start-up of the internal combustion engine 1 favorably.

In addition, the cooling oil outlet portion 96 is disposed on one side of the cam chain chamber 13b close to the cam chain tensioner 71, whereas the temperature sensor 110 is mounted so that it penetrates the cylinder head 13 in the same direction as the tensioner lifter 70 and faces the cam chain chamber 13b. Thus, by disposing the temperature sensor 110 at the back of the cam chain tensioner 71, the temperature sensor 110 and the cooling oil outlet portion 96 can be made close to each other easily by use of a back space of the cam chain tensioner 71 and the temperature sensor 110 can be disposed near the cooling oil outlet portion 96, whereby accuracy in detection of the temperature of the internal combustion engine 1 by the temperature sensor 110 can be increased reliably.

Further, oil having flowed from the cooling oil outlet portion 96 is guided to the oil pooling portion 98 via the partition rib portions 99. Thus, the tip temperature detecting unit 110a of the temperature sensor 110 located inside the oil pooling portion 98 can detect the oil temperature reliably and the tip temperature detecting unit 110a is protected by the partition rib portions 99, whereby accuracy in detection of the temperature of the internal combustion engine 1 can be further increased and the warm-up operation can be carried out favorably.

As illustrated in FIG. 2, the internal combustion engine 1 of this embodiment is mounted in the motorcycle 2 and includes the cam chain chambers 12b, 13b, which are located on the right side of the motorcycle 2 in the vehicle widthwise direction with respect to the cylinder axis C opposite the left side thereof where the side stand 34 is located.

The internal combustion engine 1 mounted in the motorcycle 2 in this manner tilts leftward while the side stand 34 is in use, and therefore the temperature sensor 110 is located on the right side, which is a high position opposite the side stand side. However, in this embodiment, since oil gushing out of the cooling oil outlet portion 96 is collected inside the oil pooling portion 98 and its temperature is detected there, the warm-up operation can be carried out accurately regardless of whether the motorcycle 2 tilts leftward/rightward, which provides large flexibility in design of the internal combustion engine 1 mounted in the motorcycle 2.

In addition, as illustrated in FIG. 2, since the cylinder axis C of the internal combustion engine 1 tilts slightly forward and the intake system 37 such as the throttle body 36 and the temperature sensor 110 are arranged on the rear side of the internal combustion engine, oil returned from the cooling passage 9 is easy to separate. Thus, even when the temperature sensor 110 is disposed in the rear sidewall 13ba being a downward-directed inner surface of the cam chain chamber 13b where the returned oil is hard to collect, it is possible to detect the temperature of oil gushing out of the cooling oil outlet portion 96 by collecting the oil in the oil pooling portion 98. In addition, since the temperature sensor 110 is disposed on the rear side, the temperature sensor is protected, and the temperature sensor 110 can be disposed away from a high temperature portion of the exhaust system located on the front side of the internal combustion engine with respect to the cylinder axis C, whereby accuracy in detection by the temperature sensor 110 can be further increased and the warm-up operation can be carried out favorably.

Further, the cooling passage 9 in the internal combustion engine 1 of this embodiment includes the two oil feed side inlet openings 91, which communicate with the oil feed passage 86 of the cylinder block 12, includes inside the combustion chamber upper wall 53, the multiple oil passages 92, which are led from the two inlet openings 91 and pass through the periphery of the ignition plug 54, and includes the communicating passage 93, which couples the two oil passages 92 to each other at a position downstream of the inlet openings 91. Thus, as described previously, the sizes of the inlet openings 91 can be set so that the amounts of oil to flow through these openings may balance with each other, and the communicating passage 93 can smoothen the imbalance in the flow of oil and feed the oil thus smoothened to the two oil passages 92 downstream. This makes it possible to uniformly cool the periphery of the plug installation hole 54a of the ignition plug 54 in the combustion chamber upper wall 53 and the periphery of the combustion chamber-side openings 16a of the exhaust ports 16 where a high thermal load is applied and thus to stabilize the temperature of oil output through the cooling oil outlet portion 96 of the cooling passage 9, whereby accuracy in detection by the temperature sensor 110 can be further increased and the warm-up operation can be carried out favorably.

Although the air/oil-cooled internal combustion engine according to the embodiment of the present invention has been described hereinabove, it is needless to say that modes of the present invention are not limited to the above embodiment, and the present invention can be embodied in various modes within the gist of the present invention.

For example, any air/oil-cooled internal combustion engine may be employed as the air/oil-cooled internal combustion engine of the present invention as long as it meets the requirements of claim 1.

Further, although the placement of each device in the lateral direction has been specified in the drawings for the sake of convenience of explanation, the device may be placed the other way round from what is illustrated in the above embodiment, and the present invention also encompasses such placement.

DESCRIPTION OF REFERENCE SYMBOLS

1 INTERNAL COMBUSTION ENGINE (AIR/OIL-COOLED INTERNAL COMBUSTION ENGINE)
2 MOTORCYCLE
8 OIL PUMP
9 COOLING PASSAGE (HEAD-SIDE COOLING OIL PASSAGE)
10 CRANKCASE
11 CRANKSHAFT
12 CYLINDER BLOCK
12a CYLINDER BORE
12b CAM CHAIN CHAMBER
12c COOLING FIN
13 CYLINDER HEAD
13b CAM CHAIN CHAMBER
13ba REAR SIDEWALL
13c COOLING FIN
13e SENSOR MOUNTING HOLE
15 INTAKE PORT
16 EXHAUST PORT
19A PREDEFINED STUD BOLT
34 SIDE STAND
52 COMBUSTION CHAMBER
53 COMBUSTION CHAMBER UPPER WALL
54 IGNITION PLUG
54a PLUG INSTALLATION HOLE
58 RIGHT SUPPORT WALL
58b CAM CHAIN CHAMBER-SIDE SIDE SURFACE
60 VALVE TRAIN
62 DRIVEN CAM CHAIN SPROCKET
63 DRIVE CAM CHAIN SPROCKET
64 CAM CHAIN
69A PREDEFINED STUD BOLT HOLE
70 TENSIONER LIFTER
71 CAM CHAIN TENSIONER
86 OIL FEED PASSAGE
87 OIL GROOVE
91 INLET OPENING
92 OIL PASSAGE
93 COMMUNICATING PASSAGE
95 JUNCTION OIL PASSAGE
96 COOLING OIL OUTLET PORTION
98 OIL POOLING PORTION
99 PARTITION RIB PORTION
110 TEMPERATURE SENSOR
110a TIP TEMPERATURE DETECTING UNIT
C CYLINDER AXIS

What is claimed is:
1. An air/oil-cooled internal combustion engine including:
cooling fins that are provided on circumferences of a cylinder block and a cylinder head; and
a cooling passage that is provided in a combustion chamber upper wall covering a combustion chamber of said cylinder head and is used for cooling said combustion chamber upper wall with lubrication oil, wherein a temperature sensor configured to detect a temperature of said air/oil-cooled internal combustion engine by detecting a temperature of oil is provided to face a cooling oil outlet portion of said cooling passage, wherein said air/oil-cooled internal combustion engine includes cam chain chambers provided in the cylinder block and the cylinder head, and said cooling oil outlet portion of said cooling passage opens to the inside of the cam chain chamber of the cylinder head.

2. The air/oil-cooled internal combustion engine according to claim 1, wherein said air/oil-cooled internal combustion engine includes a cam chain housed in said cam chain chambers and configured to drive a valve train provided in said cylinder head, said cooling oil outlet portion of said cooling passage is disposed adjacent to a cam chain tensioner configured to adjust looseness of said cam chain, and said temperature sensor is mounted so that said temperature sensor penetrates said cylinder head in the same direction as a tensioner lifter configured to press said cam chain tensioner and faces said cam chain chamber.

3. The air/oil-cooled internal combustion engine according to claim 2, wherein a tip temperature detecting unit of said temperature sensor is located inside an oil pooling portion that is made by partitioning an inside of said cylinder head cam chain chamber with a partition rib portion provided in said cylinder head.

4. The air/oil-cooled internal combustion engine according to claim 3, wherein said air/oil-cooled internal combustion engine is mounted in a motorcycle, and includes said cam chain chambers at a position opposite a side stand of said motorcycle in a vehicle widthwise direction with respect to a cylinder axis.

5. The air/oil-cooled internal combustion engine according to claim 4, wherein said cylinder axis of said air/oil-cooled internal combustion engine tilts slightly forward, and an intake system and said temperature sensor are arranged on a rear side of said internal combustion engine.

6. The air/oil-cooled internal combustion engine according to claim 1, wherein said cooling passage in said combustion chamber upper wall of said cylinder head includes oil feed side inlet openings that communicate with an oil feed passage of said cylinder block, includes inside said combustion chamber upper wall oil passages that are led from said inlet openings and pass through a periphery of an ignition plug, and includes a communicating passage that couples said oil passages to each other at a position downstream of said inlet openings.

7. The air/oil-cooled internal combustion engine according to claim 2, wherein said cooling passage in said combustion chamber upper wall of said cylinder head includes oil feed side inlet openings that communicate with an oil feed passage of said cylinder block, includes inside said combustion chamber upper wall oil passages that are led from said inlet openings and pass through a periphery of an ignition plug, and includes a communicating passage that couples said oil passages to each other at a position downstream of said inlet openings.

8. The air/oil-cooled internal combustion engine according to claim 3, wherein said cooling passage in said combustion chamber upper wall of said cylinder head includes oil feed side inlet openings that communicate with an oil feed passage of said cylinder block, includes inside said combustion chamber upper wall oil passages that are led from said inlet openings and pass through a periphery of an ignition plug, and includes a communicating passage that couples said oil passages to each other at a position downstream of said inlet openings.

9. The air/oil-cooled internal combustion engine according to claim 4, wherein said cooling passage in said combustion chamber upper wall of said cylinder head includes oil feed side inlet openings that communicate with an oil feed passage of said cylinder block, includes inside said combustion chamber upper wall oil passages that are led from said inlet openings and pass through a periphery of an ignition plug, and includes a communicating passage that couples said oil passages to each other at a position downstream of said inlet openings.

10. The air/oil-cooled internal combustion engine according to claim 5, wherein said cooling passage in said combustion chamber upper wall of said cylinder head includes oil feed side inlet openings that communicate with an oil feed passage of said cylinder block, includes inside said combustion chamber upper wall oil passages that are led from said inlet openings and pass through a periphery of an ignition plug, and includes a communicating passage that couples said oil passages to each other at a position downstream of said inlet openings.

11. An air/oil-cooled internal combustion engine including:

cooling fins that are provided on circumferences of a cylinder block and a cylinder head; and a cooling passage that is provided in a combustion chamber upper wall covering a combustion chamber of said cylinder head and is used for cooling said combustion chamber upper wall with lubrication oil, wherein a temperature sensor configured to detect a temperature of said air/oil-cooled internal combustion engine by detecting a temperature of oil is provided to face a cooling oil outlet portion of said cooling passage, wherein said cooling passage in said combustion chamber upper wall of said cylinder head includes oil feed side inlet openings that communicate with an oil feed passage of said cylinder block, includes inside said combustion chamber upper wall oil passages that are led from said inlet openings and pass through a periphery of an ignition plug, and includes a communicating passage that couples said oil passages to each other at a position downstream of said inlet openings; and wherein said air/oil-cooled internal combustion engine includes cam chain chambers provided in the cylinder block and the cylinder head, and said cooling oil outlet portion of said cooling passage opens to the inside of the cam chain chamber of the cylinder head.

12. The air/oil-cooled internal combustion engine according to claim 11, wherein said air/oil-cooled internal combustion engine includes:

cam chain chambers provided in the cylinder block and the cylinder head, and said cooling oil outlet portion of said cooling passage opens to the inside of the cam chain chamber of the cylinder head, a cam chain housed in said cam chain chambers and configured to drive a valve train provided in said cylinder head, said cooling oil outlet portion of said cooling passage is disposed adjacent to a cam chain tensioner configured to adjust looseness of said cam chain, and said temperature sensor is mounted so that said temperature sensor penetrates said cylinder head in the same direction as a tensioner lifter configured to press said cam chain tensioner and faces said cam chain chamber.

13. The air/oil-cooled internal combustion engine according to claim 12, wherein
a tip temperature detecting unit of said temperature sensor is located inside an oil pooling portion that is made by partitioning an inside of said cylinder head cam chain chamber with a partition rib portion provided in said cylinder head.

* * * * *